Patented July 17, 1923.

1,461,808

UNITED STATES PATENT OFFICE.

WALTER O. SNELLING, OF ALLENTOWN, PENNSYLVANIA.

BEVERAGE.

No Drawing.    Application filed January 31, 1920.   Serial No. 355,335.

*To all whom it may concern:*

Be it known that I, WALTER O. SNELLING, a citizen of the United States, residing at Allentown, in the county of Lehigh and State of Pennsylvania, have invented certain Improvements in Beverages, of which the following is a specification.

My invention relates to improvements in beverages, and more particularly to improvements in non-alcoholic beverages containing lactic acid of fermentation.

I have discovered that by fermenting fruit juices by means of lactic acid ferments I can obtain a beverage base which possesses many desirable properties in admixture with unfermented fruit juices, and in admixture with other portions of fruit juices which have been fermented by yeast and the resulting alcohol transformed to acetic acid by means of acetic acid bacteria.

As an example of my present invention, I will describe the process which I use in preparing an improved beverage from the freshly expressed juice of apples. I first add to the freshly prepared apple cider a volume of water equal or greater than the volume of the cider taken and I then sterilize the mixture, preferably by pressure sterilization at a temperature in excess of 100° C. I then fortify the sterilized and diluted juice by means of a suitable amount of sugar, and I then add a culture of lactic acid bacteria. I maintain the mixture so prepared at a temperature of between 40° C. and 50° C. for a suitable period, which may be between 12 hours and 60 hours. I prefer to allow as much of the available sugar to be acted upon to form lactic acid as possible, but I may stop the lactic fermentation before completion for the purpose of leaving a suitable sugar content in the liquid. I prefer, however, to establish such sugar content at the close of fermentation, by adding an additional quantity of sugar, and preferably of a type which is difficultly transformed by the strain of lactic acid bacteria employed. While the above fermentation is going on I prefer to act upon another portion of the fruit juice, after suitable preliminary sterilization, by means of yeast and acetic acid bacteria and after acetification I add the treated fruit juice to the major portion of my lactic acid fermentation product, the acetified liquid being mixed with the lactic acid fermentation product in relatively small amount, as for example one part of acetified product to each 20 parts of lactic acid fermentation product.

Instead of using a pure culture of lactic acid bacteria I find that I can take advantage of the greater tendency of lactic acid to develop at temperatures in excess of 40° C., and by suitably inoculating fruit juices with lactic acid bacteria and maintaining such inoculated fluid at a temperature in excess of 40° C. I can produce a desirable preferential fermentation in which lactic acid is formed to a desired extent.

Instead of apple juice I may employ the juice of other fruits or berries, or I may employ suitable solutions of sugar and flavoring materials as substitutes for fruit juices. I have found the juice of apples, pears, oranges and grapes to be particularly adapted to the practice of my present invention, but in addition to the fruits named I have found that a large number of other fruits and berries give juices which when treated in the manner described give beverages of very pleasant character.

The basic element of my present invention is the fermenting of fruit juices by means of organisms capable of transforming sugar into lactic acid, at a temperature favorable to the development of the lactic acid bacteria and unfavorable to the development of other micro-organisms, and the adding if desired of fresh and unfermented fruit juices to the product after suitable fermentation. I prefer to dilute the liquid so prepared, and any excessive tartness which may be produced when certain fruits are used may be corrected by the addition of sugar in suitable amount.

In preparing a beverage from orange juice I find that it is desirable to first express the juice of the orange, and to separately express the essential oils from the peel. The main portion of the juice from the orange pulp, preferably after dilution and the addition of a quantity of a readily fermentable sugar is then inoculated with lactic acid-producing organisms, either with or without preliminary sterilization, and is maintained at a temperature in excess of 30° C. and preferably in excess of 40° C. for a sufficient period to induce a desirable production of lactic acid. A small additional quantity of the juice from the orange pulp is preferably treated separately with yeast and with Bacterium aceti or other acetifying organism, and when the production of acetic acid has reached a sufficient amount is added to the main portion of the juice which has been fermented by means of the lactic acid ferment. I prefer to employ from one to ten parts of the acetified juice to each one hundred parts of the juice which has been fermented by the lactic acid ferment, since a greater portion of the acetified juice gives an after-taste to the finished liquid which is unpleasant to some people.

After mixing the two portions of the treated juice I prefer to add a quantity of freshly expressed juice, and I then dilute the mixture by means of a suitable amount of water, after which I add the essential oils which have been separately expressed from the peel of the oranges used as the source of the juice. It is also desirable to add additional sugar to correct the tartness which is given by the rather high lactic acid content.

It will be readily seen that a wide range of equivalents may be used without departing from the spirit of my invention, and that such examples as I have shown are illustrative only, and are not to be considered as in any way defining such procedure as is necessary to obtain successful results. Using various types of fruit, I have obtained successful results with acidities, calculated as lactic acid, which vary from 3 g. to 10 g. to the liter, from 80 g. to 200 g. of sugar having been present in such finished beverages, in each liter, and I have also obtained satisfactory results in which acetic acid is present within the range of .2 g. to 3 g. per liter, all of these figures being for the beverage in its normal state of dilution. I may of course concentrate the solution if this is desired, to obtain a more concentrated fluid, I may entirely omit such additional flavoring materials as acetic acid when this is desired but in general I find that the presence of acetic acid in the amounts specified gives a pleasing flavor to the finished beverage. In addition to lactic acid and acetic acid it is of course evident that there is also present much of the acid originally present in the fruit juice, since the lactic acid which is formed in the course of my treatment is mainly derived from the fruit sugars present in the fruit juices, or from sugar which is added in the course of manufacture. When apple juice is employed as the raw material in the preparation of my beverage, malic acid is the acid which is mainly present with the lactic acid, while when orange juice is used as the raw material citric acid is also present in the final beverage. Using other fruits, other acids are present in the final product, tartaric acid being present in the beverage prepared from grapes for example.

Instead of depending wholly upon the sugars present in the fruit juices as the source from which the lactic acid organisms prepare lactic acid, it is frequently of advantage to add additional sugar to the fruit juices. I find that for this purpose ordinary saccharose is suitable, but I may also employ other sugars, and particularly dextrose, maltose, and other carbohydrates capable of being acted upon and decomposed by the lactic acid bacteria.

I find it of advantage to have a small amount of an alkali salt present in my fruit juice, and for this purpose I prefer to use compounds of sodium. Sodium chloride, sodium carbonate and sodium bicarbonate are the salts which I prefer to use. The quantities of these salts which are used is very small, and to obtain the best results the amount of alkali metal which is present should be less than one-tenth of one percent of the fruit juice in its normal dilution. In my preferred procedure I find that the employment of from one-half gram to one and one-half grams of a sodium salt to the liter of fruit juice in its normal dilution is desirable, but with concentrated fruit juices I may employ five grams or even more of alkali salt per liter. Instead of sodium salt I may employ a salt of calcium or magnesium, or I may employ a mixture of calcium magnesium and sodium salts.

There are some types of lactic acid ferments which tend to produce small amounts of acetic acid in the course of lactic acid fermentation. Micro-organisms of the *Bact. bulgaricum* group show this tendency to a marked extent, and when I use micro-organisms of this type in the lactic acid fermentation of fruit juices, I usually find it unnecessary to separately acetify a portion of my fruit juices, since the side reactions accompanying lactic acid fermentation produce sufficient acetic acid to give the desired flavor to my fermented juices. When I employ separate acetic acid fermentation, however, I prefer to have the amount of acetic acid in my finished product to constitute less than 20% of the total acidity present, and more satisfactory results are often obtained when the amount of acetic acid constitutes not over 10% of the total acidity present.

The characteristic features of my present invention are the fermentation of fruit juices at a temperature in excess of 40° C., by means of lactic acid bacteria, and under conditions which convert part of the sugar originally present in the fruit juices into lactic acid with the avoidance of alcoholic fermentation, and the adding to the solution so prepared of small amounts of acetic acid of fermentation, provided such acetic acid is not produced by side reactions by the particular variety of lactic acid ferment employed. The addition of small amounts of salts of alkali and alkali metals are also desirable in preparing my finished beverage, but these salts are not essential to the fermentation step, since I have found that equal results are obtained when such salts are added to my final liquor after fermentation is complete, and accordingly I believe that the true function of these salts is not in connection with the fermentation itself, but rather to alter the taste of the final product by transforming a portion of the free acid into acid salts. I find that the addition of a small amount of sodium chloride to the lactic acid fermentation product of orange juice is particularly desirable and imparts to the finished beverage a noticeable softness of flavor, while at the same time improving the flavor produced by the essential oils from the peel. Instead of using ordinary sodium chloride alone, I have successfully used the mixture of salts present in sea water, the slight bitterness of the other salts present imparting a slight but pleasing flavor.

I claim as my invention:

1. The process of treating fruit juices which comprises diluting such juices, adding a sugar, and fermenting the resulting product by means of a lactic acid ferment.

2. The process of treating fruit juices which comprises diluting such juices, adding a sugar and a lactic acid ferment. and fermenting the resulting solution until a substantial amount of lactic acid has been formed, and adding to the resulting solution essential oils of the fruit and flavoring materials.

3. The process of treating oranges which comprises separating the pulp from the peel, expressing the juice from the pulp, diluting the juice, and fermenting the diluted juice by means of a lactic acid ferment.

4. The process of treating oranges which comprises separating the pulp from the peel, expressing the juice from the pulp, diluting the juice, adding a sugar, and fermenting the diluted and sweetened juice by means of a lactic acid ferment.

5. As a new article of manufacture, diluted fruit juice containing lactic acid of fermentation, and essential oils from the peel of the fruit.

6. As a new article of manufacture, diluted orange juice containing lactic acid of fermentation and essential oils from orange peel.

In testimony whereof, I have hereunto subscribed my name this 29th day of January, 1920.

WALTER O. SNELLING.